Jan. 28, 1958 — E. E. PARKER, JR — 2,821,043
FISH LURE
Filed Oct. 5, 1956
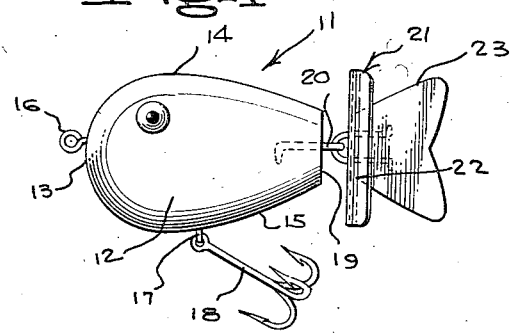
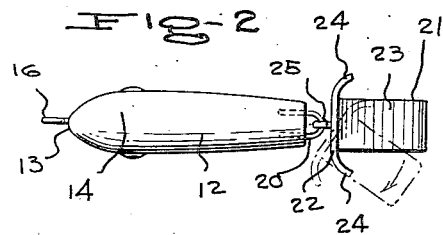
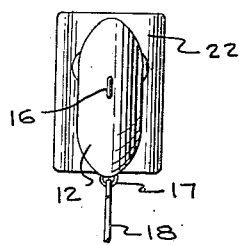
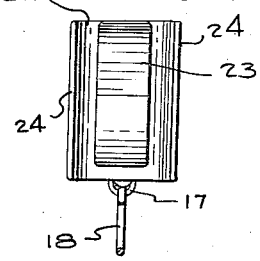
INVENTOR.
EWELL E. PARKER JR.
BY
McMorrow, Berman & Davidson
ATTORNEYS

United States Patent Office 2,821,043
    Patented Jan. 28, 1958

2,821,043

FISH LURE

Ewell E. Parker, Jr., Amarillo, Tex.

Application October 5, 1956, Serial No. 614,199

3 Claims. (Cl. 43—42.15)

This invention relates to fish lures, and more particularly to a jointed fish lure of the type providing an oscillating and quivering effect as the lure is drawn through the water.

A main object of the invention is to provide a novel and improved fish lure which is simple in construction, which involves relatively inexpensive components, and which provides a realistic oscillating and quivering action as it is drawn through the water simulating the action of live bait.

A further object of the invention is to provide an improved fish lure which is durable in construction, which is easy to assemble, and which is provided with means for violently oscillating same as it is drawn through the water, providing the appearance of a live bait fish.

Further objects and advantages of the invention will become apparent from the following description and claims, and from the accompanying drawings, wherein:

Figure 1 is a side elevational view of a fish lure constructed in accordance with the present invention.

Figure 2 is a top plan view of the fish lure of Figure 1.

Figure 3 is a front end view of the fish lure of Figures 1 and 2.

Figure 4 is a rear end view of the fish lure of Figures 1, 2 and 3.

Referring to the drawings, 11 generally designates an improved fish lure according to the present invention. The fish lure 11 comprises the main body portion 12, which is generally shaped to resemble the forward portion of an actual bait fish, the body 12 being of any suitable rigid material, said body being shaped with the curved forward end 13 and with the convergent arcuate top and bottom edges 14 and 15, the body being relatively flat, as shown in Figure 2, and being provided at the forward end portion 13 with an eye member 16 for attachment to a fishing line.

A similar eye member 17 is provided at the intermediate portion of the bottom edge 15 of main body 12, and pivotally attached thereto is a multiple hook assembly 18.

The main body 12 is formed with the vertical flat rear end surface 19, and secured in the intermediate portion of said rear end surface 19 is a staple 20 which extends transverse to the main body 12, as viewed in Figure 1. Designated generally at 21 is a tail assembly comprising a vertical, channel-shaped bill 22 in the intermediate portion of which is rigidly secured a rearwardly flaring tail member 23 of substantial transverse thickness, as shown in Figure 2. As shown in Figure 1, the tail member 23 is shaped to resemble in side elevation the tail of a fish, but has substantial weight, since it is of substantial thickness, as is clearly shown in Figures 2 and 4. The vertical channel member 22 includes the arcuately curved end flanges 24, 24 which extend rearwardly, as shown in Figure 2, and which react with the water as the lure is drawn therethrough to provide an oscillating action, as will be presently described.

A staple member 25 is secured to the tail assembly 21, extending through the vertical, channel-shaped bill 22, as shown in Figure 1 and into the main tail element 23, the bight portion of the staple 25 being interengaged with the bight portion of the staple 20, pivotally connecting the tail assembly 21 to the rear end of the main body 12 of the lure.

In use, as the lure is drawn through the water, the water reacts against the curved flange elements 24, 24 of the bill member 22, causing the tail assembly to be oscillated laterally back and forth, in response to any slight deviation in the direction of movement of the lure. Since the lure is rarely drawn through the water in a perfectly straight line, an unbalance of pressures is usually created on the flange elements 24, 24, causing the tail assembly to oscillate back and forth at a relatively rapid rate, providing the appearance of a live bait fish, and creating an effect which is highly attractive to real fish.

When the tail assembly oscillates, because of its weight, it produces a reaction on the forward main body portion 12 of the lure, causing said forward portion to quiver simultaneously with the oscillation of the tail assembly 21. This further enhances the life-like appearance of the lure and increases its attractiveness to fish.

The lure may be suitably decorated to enhance the resemblance thereof to an actual bait fish, and may be suitably weighted depending upon the desired manner of use thereof, namely, as to whether the lure is to be employed for relatively deep water fishing, in medium depth, or at the surface.

As above described and illustrated in the drawings, the transversely extending bill 22 is channel-shaped and is rearwardly concave. However, in acordance with the present invention, the transversely extending bill may be arranged so that it is forwardly concave, namely, with the end flanges thereof extending forwardly. As a further alternative, the transversely extending bill may be prefectly flat instead of being channel-shaped and may be provided with flat side portions projecting laterally with respect to the tail member 23.

While a specific embodiment of an improved fish lure has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fish lure comprising a substantially flat vertical main body, means for securing said main body to a fishing line, said main body being formed with a transverse vertical rear surface, a rigid tail element pivotally connected to the intermediate portion of said rear end surface of said main body, and a channel-shaped bill rigidly secured to the forward end of said tail element and having curved vertical side flanges extending rearwardly and divergently with respect to the tail element.

2. A fish lure comprising a substantially flat, vertical main body shaped to resemble the forward portion of a bait fish, means for securing said main body to a fishing line, said main body being formed with a transverse vertical rear surface, a rigid tail element of substantial thickness and flaring rearwardly in height, means pivotally connecting said tail element to the intermediate portion of said rear end surface of said main body, and a channel-shaped bill rigidly secured to the forward end of said tail element and having curved vertical side flanges extending rearwardly and divergently with respect to the tail element.

3. A fish lure comprising a substantially flat, vertical main body shaped to resemble the forward portion of a bait fish, means for securing said main body to a fishing line, said main body being formed with a transverse vertical rear surface, a rigid tail element of substantial thickness and flaring rearwardly in height, means pivotally connecting said tail element to the intermediate portion of said rear end surface of said main body for free rotation in all directions relative to said rear surface, and a channel-shaped bill receiving and secured rigidly to the forward end of said tail element, said bill projecting substantial distances above and below the top edges of the tail element and having curved vertical side flanges extending rearwardly and divergently with respect to the tail element.

References Cited in the file of this patent

UNITED STATES PATENTS

| D. 113,611 | McArthur | Feb. 28, 1939 |
| 2,445,523 | Goldbach | July 20, 1948 |
| 2,556,533 | Graaten | June 12, 1951 |
| 2,638,698 | Eppinger | May 19, 1953 |
| 2,708,805 | Garvie | May 24, 1955 |